US010627636B2

(12) United States Patent
Hibino et al.

(10) Patent No.: US 10,627,636 B2
(45) Date of Patent: Apr. 21, 2020

(54) LENTICULAR DISPLAY

(71) Applicant: FUJIFILM CORPORATION, Minato-ku, Tokyo (JP)

(72) Inventors: Ryou Hibino, Shizuoka (JP); Masafumi Yoshida, Shizuoka (JP); Ryuichi Katsumoto, Shizuoka (JP); Yanlong Che, Shizuoka (JP)

(73) Assignee: FUJIFILM CORPORATION, Tokyo (JP)

( * ) Notice: Subject to any disclaimer, the term of this patent is extended or adjusted under 35 U.S.C. 154(b) by 121 days.

(21) Appl. No.: 15/944,803

(22) Filed: Apr. 4, 2018

(65) Prior Publication Data

US 2018/0224661 A1   Aug. 9, 2018

Related U.S. Application Data

(63) Continuation of application No. PCT/JP2016/079186, filed on Sep. 30, 2016.

(30) Foreign Application Priority Data

Oct. 6, 2015   (JP) .................. 2015-198523

(51) Int. Cl.
    *G02B 3/06*        (2006.01)
    *G02B 27/02*       (2006.01)
    (Continued)

(52) U.S. Cl.
    CPC ......... *G02B 27/022* (2013.01); *G02B 3/0056* (2013.01); *G02B 3/06* (2013.01);
    (Continued)

(58) Field of Classification Search
    CPC .................................. G02B 27/022
    (Continued)

(56) References Cited

U.S. PATENT DOCUMENTS

2011/0181853 A1   7/2011   Orimoto
2018/0017802 A1*  1/2018   Katsumoto ............ G02B 27/22

FOREIGN PATENT DOCUMENTS

| JP | H09-305135 A  | 11/1997 |
| JP | 2011-154300 A | 8/2011  |
| JP | 2013-25043 A  | 2/2013  |

OTHER PUBLICATIONS

Office Action dated Mar. 5, 2019, issued by the JPO in corresponding Japanese Patent Application No. 2017-544472.

(Continued)

*Primary Examiner* — James C. Jones
(74) *Attorney, Agent, or Firm* — Solaris Intellectual Property Group, PLLC

(57) ABSTRACT

Provided is a lenticular display including a lenticular lens including a plurality of columnar convex lenses that each have a semicylindrical surface and are arrayed in parallel and a lenticular image disposed on an opposite side of the convex lenses from the semicylindrical surface. The lenticular image includes an image strip group in which a plurality of image strips for displaying a plurality of display images respectively are arranged in positions for causing the image strips to be displayed through the plurality of convex lenses respectively in a state where a longitudinal direction of the image strips is parallel to a longitudinal direction of the plurality of convex lenses, and in the image strip groups, and a total width of image strips for displaying at least one display image among the plurality of display images is larger than a total width of image strips for displaying another display image.

6 Claims, 9 Drawing Sheets

(51) Int. Cl.
    *G03B 25/02* (2006.01)
    *G09F 19/14* (2006.01)
    *G02B 30/27* (2020.01)
    *G02B 3/00* (2006.01)
(52) U.S. Cl.
    CPC ............ *G02B 30/27* (2020.01); *G03B 25/02* (2013.01); *G09F 19/14* (2013.01); *G02B 2003/0093* (2013.01)
(58) Field of Classification Search
    USPC ........................................................ 359/710
    See application file for complete search history.

(56) References Cited

OTHER PUBLICATIONS

English language translation of the following: Office action dated Apr. 1, 2019 from the SIPO in a Chinese patent application No. 201680057631.4 corresponding to the instant patent application.
International Search Report issued in International Application No. PCT/JP2016/079186 dated Dec. 13, 2016.
Written Opinion of the ISA issued in International Application No. PCT/JP2016/079186 dated Dec. 13, 2016.

* cited by examiner

LENTICULAR DISPLAY

CROSS-REFERENCE TO RELATED APPLICATION

This application is a continuation application of International Application No. PCT/JP2016/079186, filed Sep. 30, 2016, the disclosure of which is incorporated herein by reference in its entirety. Further, this application claims priority from Japanese Patent Application No. 2015-198523, filed Oct. 6, 2015, the disclosure of which is incorporated herein by reference in its entirety.

BACKGROUND OF THE INVENTION

1. Field of the Invention

The present invention relates to a lenticular display.

2. Description of the Related Art

As a medium displaying different images depending on the viewing angle, a lenticular display is known in which a lenticular lens including convex lenses, which have a semi-cylindrical surface and are arrayed in parallel, is used.

Generally, in the lenticular display, an image strip group (lenticular image) obtained by combining a plurality of interlaced images is disposed on a rear surface side of the lenticular lens (a surface on an opposite side from the semicylindrical surface of the convex lenses). In a case where the lenticular display is observed through the lenticular lens, the image changes depending on the observation angle.

For example, JP2013-25043A discloses an image display having a constitution in which a lenticular sheet constituted with an array of a plurality of cylindrical lenses and an image forming layer are laminated. In this image display, a difference between an array pitch length of the cylindrical lenses and a pitch length of images for virtual image observation repeatedly formed on the image forming layer is within a range of 0% to 10% of the array pitch length of the cylindrical lenses or the pitch length of the images for virtual image observation.

SUMMARY OF THE INVENTION

In the present disclosure, in a case where a plurality of elements having the same constitution are arranged, "n" that appears together with the reference of each element means that the element is the nth (n is any integer equal to or smaller than N) element among N (N is an integer equal to or greater than 2) elements. The lenticular display of the present disclosure is not limited to the embodiments specifically illustrated in drawings. In the following description, any n has the same definition as described above.

FIG. 1 schematically shows an example of a method for creating a lenticular image from two display images desired to be displayed by using a lenticular display.

First, a display image A (hereinafter, referred to as "image A" in some cases) and a display image B (hereinafter, referred to as "image B" in some cases) to be displayed by a lenticular display are prepared (FIG. 1(*a*)). Then, A image element and B image element (hereinafter, these image elements will be referred to as "image strips" in some cases) extracted by dividing each of the images A and B in the form of stripes are alternately arranged, thereby creating a composite image (FIG. 1(*b*)). Thereafter, the composite image is compressed such that the aspect ratio thereof equals the aspect ratio of the original images A and B. In this way, a lenticular image is obtained in which the image strips for displaying each of the display images A and B are alternately arranged (interlaced) and which has the same size as that of the display images A and B (FIG. 1(*c*)).

FIG. 2 schematically shows an example of the constitution of a general lenticular display of the related art. In the lenticular display shown in FIG. 2, a lenticular image 24 is disposed on a flat surface on an opposite side from the semicylindrical surface of a lenticular lens 22 in which semicylindrical lenses are arranged in parallel. For example, in a case where the lenticular display has a lenticular lens including N (N is an integer equal to or greater than 2) convex lenses arrayed in parallel, under the nth (n is any integer equal to or smaller than N) convex lens counted from one end in the direction along which the convex lenses are arrayed in parallel, an image strip group is disposed in which an image strip An extracted from the image A and an image strip Bn extracted from the image B are arranged in a state where the longitudinal direction of the image strips is parallel to the longitudinal direction of the convex lenses. In a case where the lenticular display constituted as above is viewed from the semicylindrical surface side of the lenticular lens 22, the image changes depending on the viewing angle. For example, along a visual line 6 in FIG. 2, image strips An−1, An, and An+1 for displaying the image A are enlarged and composed in a width direction X through convex lenses 22An−1, 22An, and 22An+1 respectively, and in this way, the image A is displayed. Likewise, along a visual line 3, image strips Bn−1, Bn, and Bn+1 for displaying the image B are enlarged and composed in the width direction X through convex lenses 22An−1, 22An, and 22An+1 respectively, and in this way, the image B is displayed. In a visual line 5 in FIG. 2, the image A and the image B tend to be seen in a mixed state.

The aforementioned lenticular display, in which the image strips for displaying a plurality of display images respectively are evenly and alternately arranged under the respective convex lenses, can display a desired image depending on the viewing angle. However, with the lenticular display, it is impossible to prioritize a plurality of images to be displayed and to display an image by widening the angle at which a specific image desired to be highlighted is seen.

With the image display disclosed in JP2013-25043A, images can be smoothly changed using the images for virtual image observation, but it is impossible to display a specific image by highlighting the image.

An object of an embodiment of the present invention is to provide a lenticular display which makes it possible to relatively widen an angle at which a specific image among a plurality of images to be displayed is seen.

The present invention includes the following aspects.

<1> A lenticular display comprising:

a lenticular lens including a plurality of columnar convex lenses that each have a semicylindrical surface and are arrayed in parallel; and a lenticular image disposed on an opposite side of the plurality of convex lenses from the semicylindrical surface, in which the lenticular image includes an image strip group in which a plurality of image strips for displaying a plurality of display images respectively are arranged in positions for causing the image strips to be displayed through the plurality of convex lenses respectively in a state where a longitudinal direction of the image strips is parallel to a longitudinal direction of the plurality of convex lenses, and in the image strip group, a total width of image strips for displaying at least one display image among the plurality of display images is larger than a total width of image strips for displaying another display image.

<2> The lenticular display according to <1>, in which a relative position of the center of the image strip group, which is displayed through each of the convex lenses, in a width direction deviates from the center of each of the convex lenses in the width direction along the width direction of the plurality of convex lenses.

<3> The lenticular display according to <2>, in which a ratio of deviation of the relative position of the center of the image strip group in the width direction from the center of each of the convex lenses in the width direction is 10% to 40% of a width of each of the convex lenses.

<4> The lenticular display according to <2>, in which a ratio of deviation of the relative position of the center of the image strip group in the width direction from the center of each of the convex lenses in the width direction is 16% to 25% of a width of each of the convex lenses.

<5> The lenticular display according to any one of <1> to <4>, in which the number of the plurality of image strips included in the image strip group for one convex lens is equal to or greater than 3 and equal to or smaller than 12.

<6> The lenticular display according to any one of <1> to <5>, in which the image strips having a large total width are arranged in positions including the center of the image strip group in the width direction.

According to an embodiment of the present invention, a lenticular display is provided which makes it possible to relatively widen an angle at which a specific image among a plurality of images to be displayed is seen.

DESCRIPTION OF THE PREFERRED EMBODIMENTS

Figure 1:
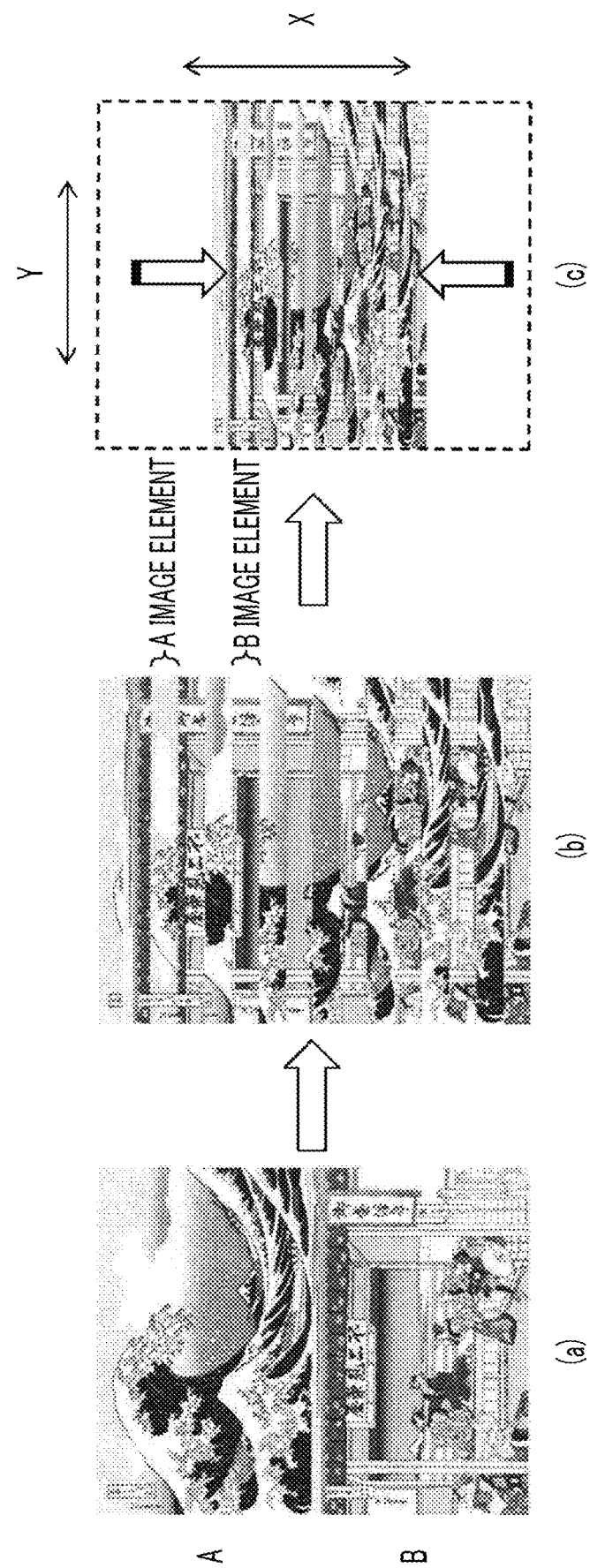
FIG. 1 is a schematic view showing an example of a method for creating a lenticular image.
Figure 2:
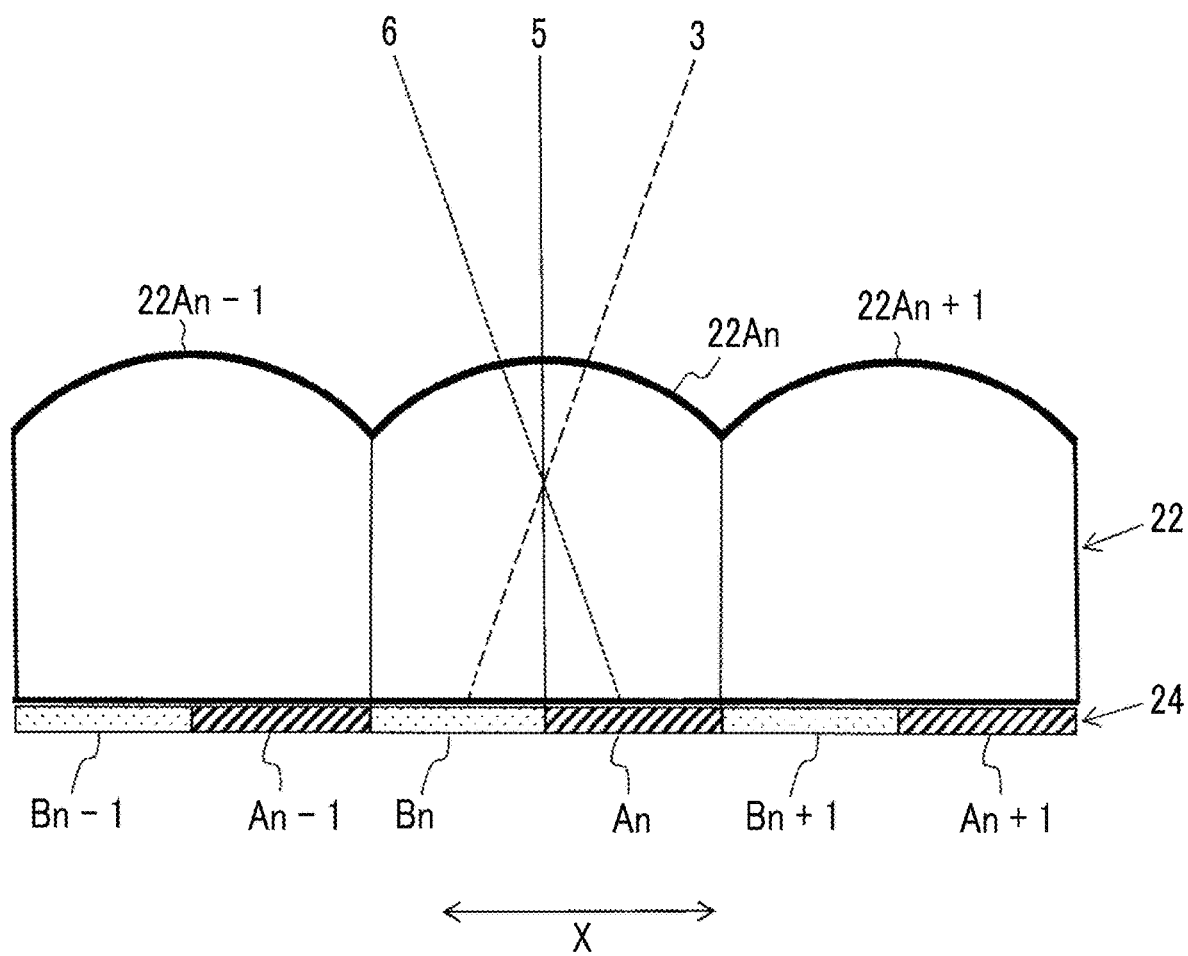
FIG. 2 is a schematic view showing an example of the constitution of a lenticular display of the related art.

Hereinafter, embodiments of the present invention will be specifically described with reference to the attached drawings, but the present invention is not limited to the embodiments described below. In the embodiments described below, the descriptions and references that overlap with each other will not be repeated in some cases.

A lenticular display of the present disclosure includes a lenticular lens including a plurality of columnar convex lenses (hereinafter, referred to as "lenses" in some cases) that each have a semicylindrical surface and are arrayed in parallel, and a lenticular image disposed on an opposite side (hereinafter, referred to as "rear surface side" in some cases) of the plurality of convex lenses from the semicylindrical surface. The lenticular image includes an image strip group in which a plurality of image strips for displaying a plurality of display images (referred to as "images" in some cases) respectively are arranged in positions for causing the image strips to be displayed through the respective convex lenses respectively in a state where a longitudinal direction of the image strips is parallel to a longitudinal direction of the plurality of convex lenses. In the image strip group, a total width of image strips for displaying at least one display image among the plurality of display images is larger than a total width of image strips for displaying another display image. In the present disclosure, "display image" means an image to be displayed by the lenticular display, that is, an image to be recognized by an observer in a case where the observer observes the lenticular display from the semicylindrical surface side of the lenticular lens. Furthermore, being arranged in "positions for causing the image strips to be displayed through the convex lenses" means that the image strips are arranged in specific positions on the rear surface side of each of specific convex lenses through which the observer can visually recognize the image strips in a case where the observer observes the lenticular display of the present disclosure from the semicylindrical surface side of the lenticular lens. The plurality of columnar convex lenses each having a semicylindrical surface refer to lenses whose cross-section orthogonal to the longitudinal direction thereof has an outline including a convexly curved portion and has a columnar shape extending along the longitudinal direction. Due to the presence of the convexly curved surface, the aforementioned lenses function as convex lenses.

In the lenticular display of an embodiment of the present invention, in an image strip group corresponding to each convex lens, the total width of image strips for displaying a specific image is wider than the total width of image strips for displaying another image. Therefore, the angle, at which the image strips for displaying the specific image through each convex lens are displayed, is relatively large. Consequently, it is possible to relatively widen the angle at which the specific image composed through the lenticular lens is seen.

Figure 3:
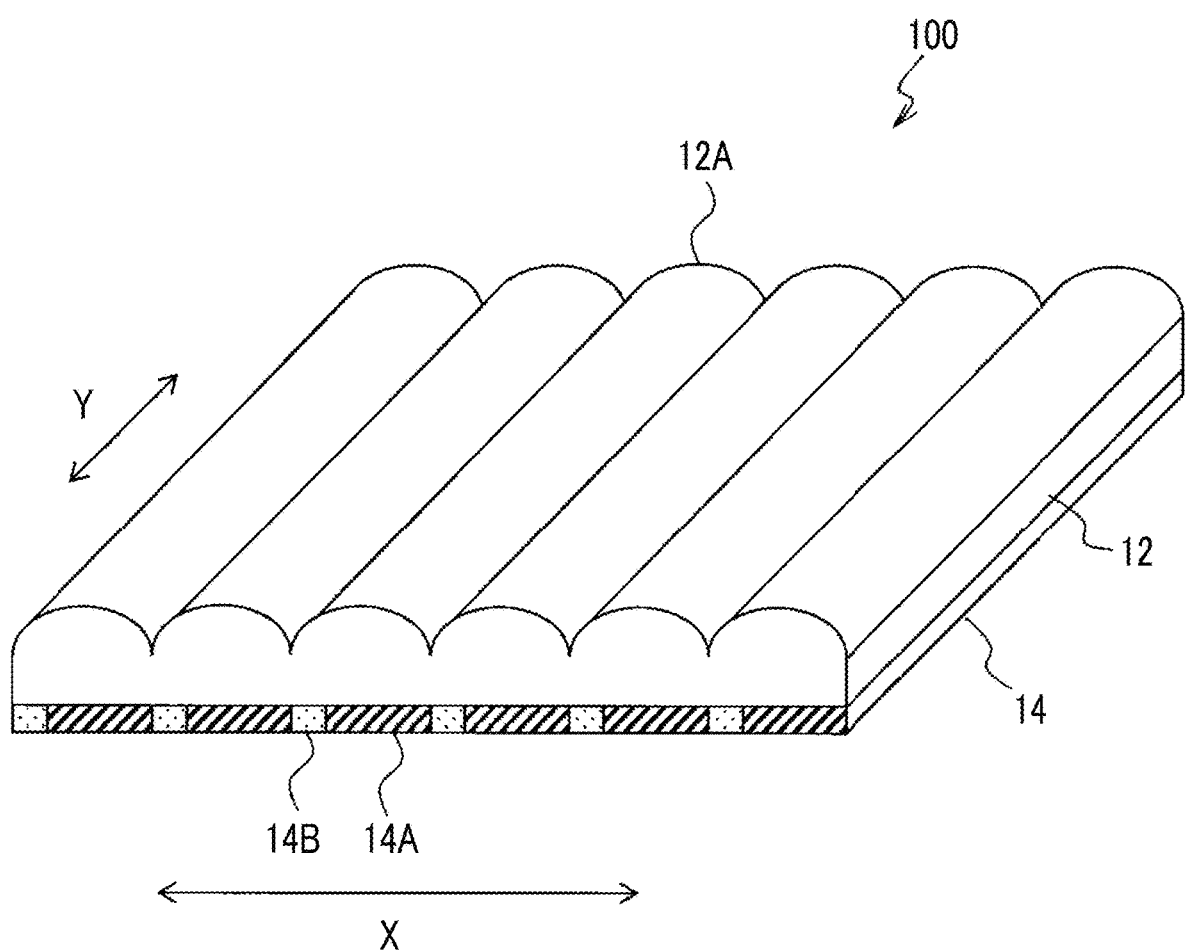
FIG. 3 is a schematic perspective view showing an example of a lenticular display of the present disclosure.

FIG. 3 schematically shows an example of the lenticular display of the present disclosure. The X-direction represents a width direction of each convex lens 12A and a direction along which a plurality of convex lenses 12A are arrayed. The Y-direction represents a longitudinal direction of each convex lens 12A. In a lenticular display 100 shown in FIG. 3, for each convex lens 12A of a lenticular lens 12, an image strip 14A and an image strip 14B of a lenticular image 14 are disposed on a smooth surface on an opposite side of the convex lens 12A from the semicylindrical surface, in a state where the longitudinal direction of each of the image strips is parallel to the longitudinal direction of each of the convex lenses 12A. The image strips 14A and 14B are obtained by dividing display images A and B respectively in the form of stripes and compressing divided images. The total width of the image strips 14A is larger than the total width of the image strips 14B. Therefore, in a case where an observer observes the lenticular display from the semicylindrical surface side of the lenticular lens, the angle at which the image strip 14A is observed becomes wider than the angle at which the image strip 14B is observed through each of the convex lenses, and the angle at which the image A composed of the image strips A is seen becomes wider than the angle at which the image B composed of the image strips B is seen.

Hereinafter, the constitution of the lenticular display of the present disclosure will be specifically described.

Lenticular Lens

The lenticular lens has a constitution in which a plurality of columnar convex lenses, each having a semicylindrical surface on the side from which the lenticular display is observed, are arrayed in parallel. The lenticular lens is formed of a resin having light-transmitting properties.

Examples of the resin for constituting the lenticular lens (for example, the lenticular lens 12 in FIG. 3) include a polymethyl methacrylate resin (PMMA), a polycarbonate resin, a polystyrene resin, a methacrylate-styrene copolymer resin (MS resin), an acrylonitrile-styrene copolymer resin (AS resin), a polypropylene resin, a polyethylene resin, a polyethylene terephthalate resin, a glycol-modified polyethylene terephthalate resin, a polyvinyl chloride resin (PVC), a thermoplastic elastomer, a copolymer of these, a cycloolefin polymer, and the like. Considering the ease of melt extrusion, it is preferable to use resins having low melt viscosity, such as a polymethyl methacrylate resin (PMMA), a polycarbonate resin, a polystyrene resin, a methacrylate-styrene copolymer resin (MS resin), a polyethylene resin, a polyethylene terephthalate resin, and a glycol-modified polyethylene terephthalate resin. It is more preferable to use a glycol-modified polyethylene terephthalate resin, because then the lens shape formed on the surface of an embossing roller is easily transferred and the lens layer does not easily crack at the time of embossing. The lenticular lens may be constituted with a plurality of resins.

Lenticular Image

The lenticular image (for example, the lenticular image 14 in FIG. 3) includes an image strip group on an opposite side from the semicylindrical surface of the plurality of convex lenses (for example, the convex lenses 12A in FIG. 3) of the lenticular lens (for example, the lenticular lens 12 in FIG. 3). In the image strip group, a plurality of image strips (for example, the image strips 14A and 14B in FIG. 3) for displaying a plurality of display images respectively are arranged in positions for causing the image strips to be displayed through the plurality of convex lenses respectively, in a state where the longitudinal direction of the image strips is parallel to the longitudinal direction of the plurality of convex lenses. In the image strip group, the total width of the image strips for displaying at least one display image among the plurality of display images is larger than the total width of image strips for displaying another display image.

The lenticular image may be directly formed on the rear surface (smooth surface) of the lenticular lens or may be formed on a recording medium disposed on the rear surface side of the lenticular lens.

For example, an image layer may be formed by forming a lenticular image on a surface of a recording medium such as paper or plastic by means of the aforementioned method, and the surface of the recording medium, on which the lenticular image is formed, and a surface on an opposite side from a semicylindrical surface of a lenticular lens, in which a plurality of convex lenses each having a semicylindrical surface and are arrayed in parallel, may be bonded to each other through, for example, a transparent adhesive layer or without the intervention of an adhesive layer, whereby the lenticular display according to the present disclosure may be constituted.

Figure 4:
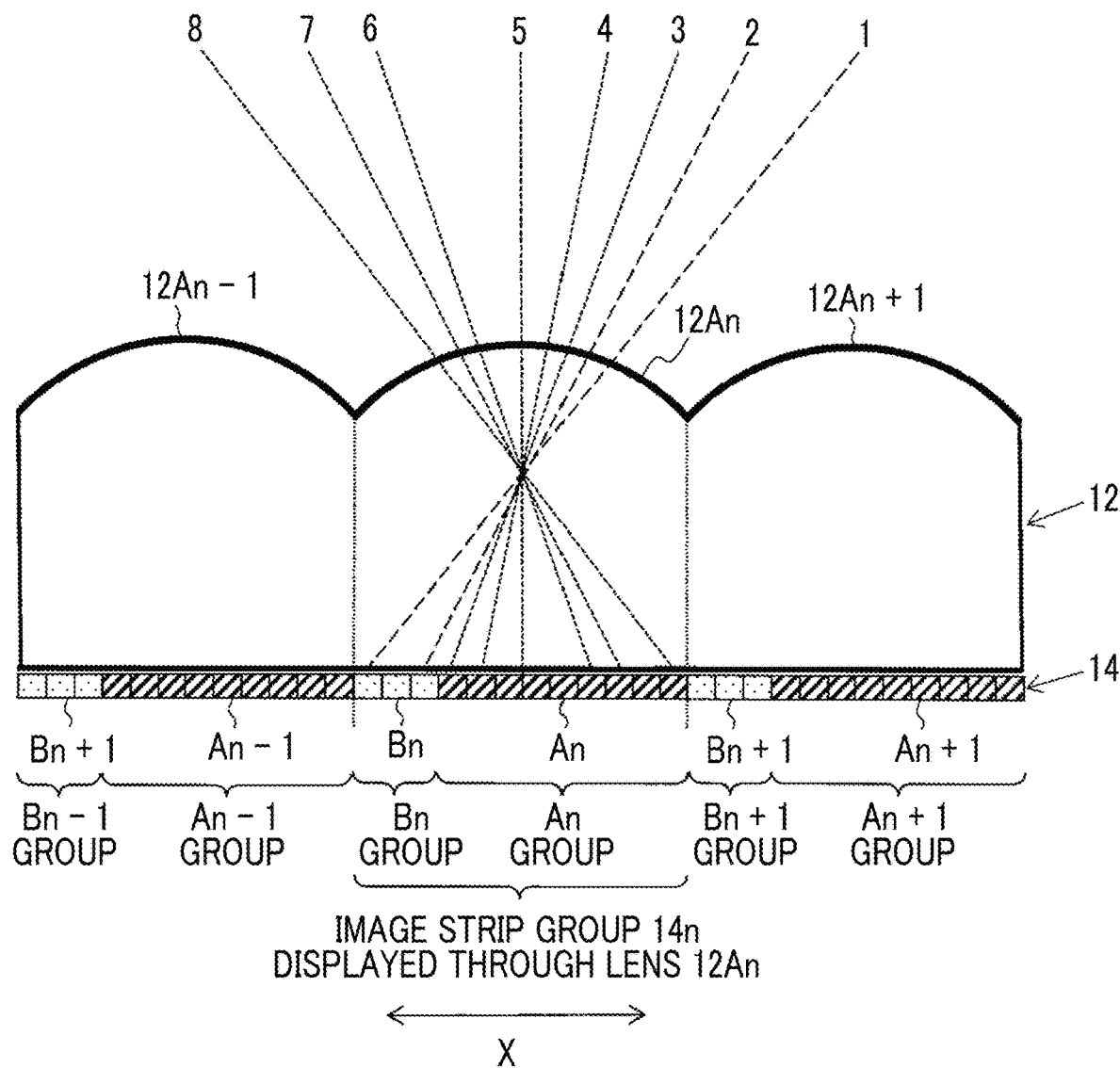
FIG. 4 is a schematic view showing an example of image strip groups arranged under convex lenses of the lenticular display of the present disclosure.

FIG. 4 schematically shows an example of image strip groups of the lenticular image 14 disposed under the convex lenses of the lenticular lens 12 of the lenticular display of the present disclosure. In the embodiment shown in FIG. 4, under one convex lens (for example, a convex lens 12An), an image strip group (for example, an image strip group 14n) is disposed which consists of twelve image strips (for example, image strips An and Bn) arranged in the width direction of the convex lens in a state where the longitudinal direction of each of the image strips is parallel to the longitudinal direction of each of the convex lenses.

For example, in the embodiment shown in FIG. 4, as image strips to be displayed through the nth convex lens 12An, an An image strip group (An group), in which nine image strips An obtained by dividing the image A in the form of stripes and compressing the divided images are arranged in parallel along the parallel arrangement direction X of the convex lenses 12An, and a Bn image strip group (Bn group), in which three image strips Bn obtained by dividing the image B in the form of stripes and compressing the divided images are arranged in parallel, form an image strip group 14n in combination. The image strips An included in the An group have the same constitution, and the image strips Bn included in the Bn group have the same constitution. As shown in FIG. 4, under convex lenses (for example, convex lenses 12An−1 and 12An+1) other than the convex lens 12An, image strips (for example, image strips An−1 and Bn−1 and image strips An+1 and Bn+1) to be displayed through the respective convex lenses are arranged in the same manner, and an image strip group (for example, an An−1 image strip group (An−1 group) or an An+1 image strip group (An+1 group)) in which nine image strips (for example, image strips An−1 and An+1) for displaying the image A are arranged in parallel and an image strip group (for example, a Bn−1 image strip group (Bn−1 group) or a Bn+1 image strip group (Bn+1 group)) in which three image strips (for example, image strips Bn−1 and Bn+1) for displaying the image B are arranged in parallel form one image strip group consisting of twelve image strips in total. In FIG. 4, convex lenses other than the convex lenses 12An, 12 An−1, and 12An+1 and other image strip groups are not illustrated. In the example shown in FIG. 4, by the constitution described above, the pitch of the image strip groups (distance between the centers of the adjacent image strip groups in the width direction X) displayed through each of the convex lenses becomes equal to the pitch of the convex lens 12A (distance between the centers of the adjacent convex lenses in the width direction X), and the relative position of the center of the image strip group, which is displayed through each convex lens, in the width direction is matched with the center of each convex lens in the width direction.

In a case where the lenticular display for performing display shown in FIG. 4 is observed from the semicylindrical surface side of the lenticular lens, for example, along visual lines 3 to 8, the image A is displayed which is formed of the image strips A for displaying the image A that are enlarged and composed through the respective convex lenses in the width direction X. Along visual lines 1 and 2, the image B is displayed which is formed of the image strips B for displaying the image B that are enlarged and composed through the respective convex lenses 12A in the width direction. That is, in the aspect illustrated in FIG. 4, the angle at which the image A is seen is relatively larger than the angle at which the image B is seen, and even in the visual line 5 along which the lenticular display is observed at an angle at which the lenticular display is viewed straight on (angle perpendicular to the lenticular display in the central position of the lenticular display), the image A is also displayed. Therefore, the image A is displayed with a much higher priority over the image B, and the display of the image A can be highlighted.

Figure 5:
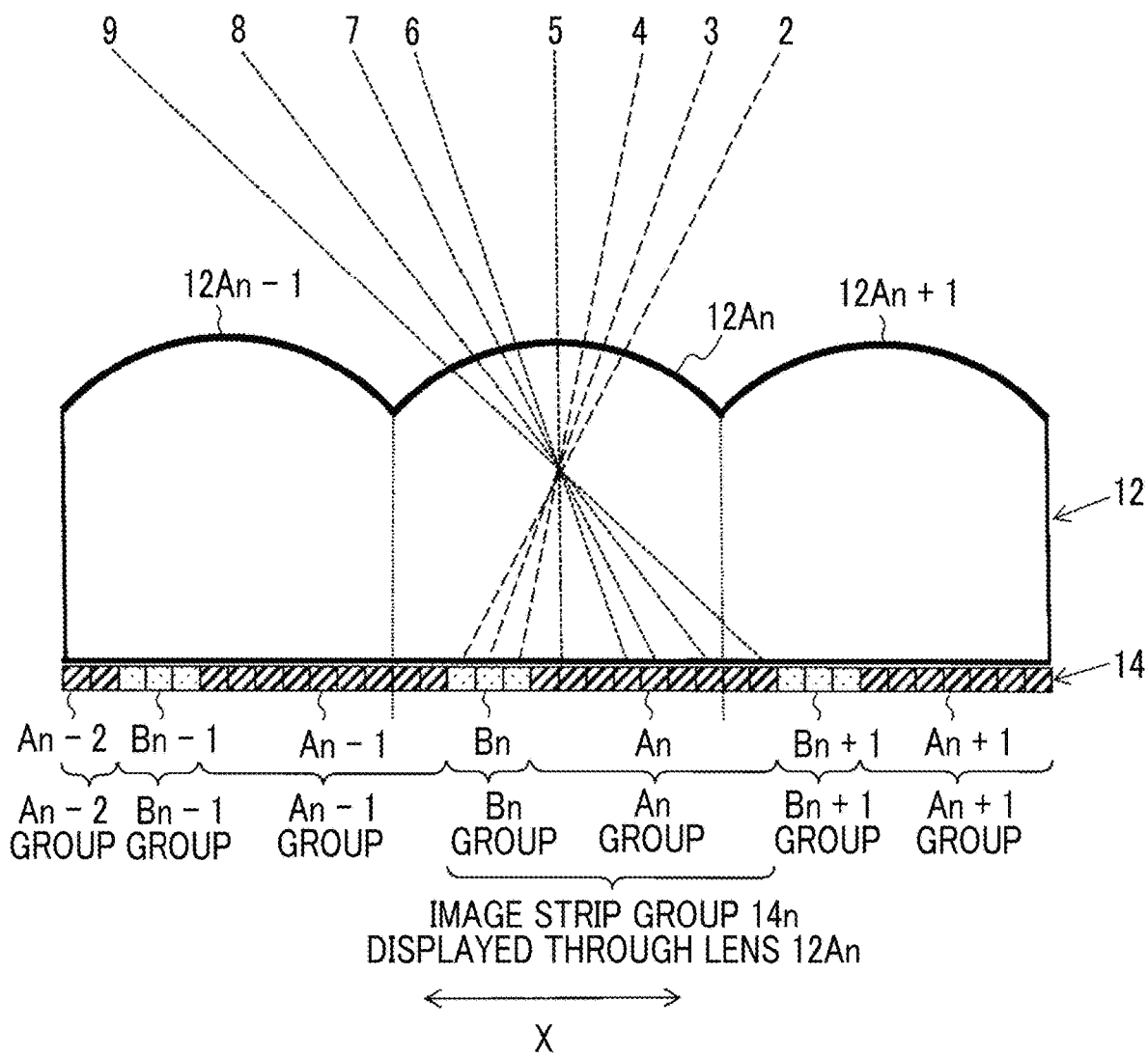
FIG. 5 is a schematic view showing another example of the image strip groups arranged under the convex lenses of the lenticular display of the present disclosure.

FIG. 5 schematically shows another example of the image strip groups of the lenticular image 14 disposed under the convex lenses of the lenticular lens 12 of the lenticular display of the present disclosure. In the example shown in FIG. 5, the An image strip group (An group) in which nine image strips An for displaying the image A are arranged in parallel and the Bn image strip group (Bn group) in which three image strips Bn for displaying the image B are arranged in parallel also constitute one image strip group consisting of twelve image strips in total and form the image strip group 14n. As shown in FIG. 5, the pitch of the convex lenses 12A is equal to the pitch of the image strip groups displayed through the respective convex lenses. In contrast, the relative position of the center of the image strip group, which is displayed through each convex lens, in the width direction deviates from the center of each convex lens in the width direction along the width direction of the convex lens. Specifically, in the example shown in FIG. 5, for example, among the nine image strips An included in the An group, two image strips An are arranged under the convex lens 12An+1 adjacent to the convex lens 12An. Furthermore, under the convex lens 12An+1, seven image strips An+1 among the nine image strips An+1 included in the An+1 image strip group (An+1 group), three image strips Bn+1 included in the Bn+1 image strip group (Bn+1 group), and two image strips An are arranged. In addition, under a convex lens 12An−1, seven image strips An−1 among the nine image strips An−1 included in the An−1 image strip group (An−1 group), three image strips Bn−1 included in the Bn−1 image strip group (Bn−1 group), and two image strips An−2 among the nine image strips An−2 included in an An−2 image strip group (An−2 group) disposed under a convex lens 12An−2 (not shown in the drawing) adjacent to a convex lens 12An−1 are arranged.

In a case where the lenticular display for performing display shown in FIG. 5 is observed from the semicylindrical surface side of the lenticular lens, for example, along visual lines 5 to 9, the image A is displayed which is formed of the image strips for displaying the image A that are enlarged and composed through the respective convex lenses 12A in the width direction X. Along the visual lines 2, 3, and 4, the image B is displayed which is formed of the image strips B that are enlarged and composed through the respective convex lenses 12A in the width direction X. In FIG. 5, along the visual line 9, the lenticular display is observed at an angle lower than an angle at which the lenticular display is observed along the visual line 8. The lenticular display shown in FIG. 5 can display the image A at a lower angle compared to the lenticular display shown in FIG. 4.

In the lenticular display for performing display shown in FIG. 5, for example, in order to cause an image An, which is disposed under the adjacent convex lens 12An+1, to be displayed (visually recognized) through the convex lens 12An along the visual line 9, the surface shape, the height (thickness), and the like of the convex lens may be adjusted.

For example, in a case where a lenticular image is formed directly on the rear surface (smooth surface) of the lenticular lens, at the time of forming the image, the image may be formed while the position of the image is made to relatively deviate from the lenticular lens. For example, in a case where the image is directly printed on the rear surface (smooth surface) of the lenticular lens by using a printing machine, the set values of the printing machine may be changed such that the lenticular images deviate from the lenticular lens (such that the lenticular image deviates by the width of two image strips in the embodiment shown in FIG. 5, for example).

In contrast, in a case where a lenticular image is formed on a recording medium disposed on the rear surface side of the lenticular lens, at the time of disposing the recording medium, on which the lenticular image is formed, on the rear surface side of the lenticular lens, the position in which the lenticular image is disposed may be caused to deviate from the lenticular lens (for example, in the embodiment shown in FIG. 5, the position may be caused to deviate by the width of two image strips).

In a case where the relative position of the center of the image strip group, which is displayed through a convex lens, in the width direction is caused to deviate from the center of the convex lens in the width direction as shown in FIG. 5, a ratio of deviation of the relative position may be set according to the use of the lenticular display. In the present disclosure, the ratio of deviation of the relative position of the center of each image strip group in the width direction is preferably 10% to 40% of the width of each convex lens. In a case where the ratio of deviation of the relative position of the image strip group from each convex lens is equal to or higher than 10%, a specific image can be effectively displayed at a lower angle. In a case where the ratio of deviation is equal to or lower than 40%, it is easy to align the lenticular lens and the lenticular image. In this respect, the relative positional deviation between each convex lens and the image strip group is more preferably 16% to 25% of the width of each convex lens.

The image strips arranged at the center of the image strip group in the width direction are not particularly limited. For example, image strips having a relatively small total width may be arranged in the position including the center of the image strip group in the width direction. However, as shown in FIG. 5, it is preferable that image strips (for example, the image strips An) having a large total width are arranged at the center of the image strip group. In the example shown in FIG. 5, at the center of the image strip group 14n, which is disposed under the convex lens 12An, in the width direction X, the image strips An for displaying the image A are arranged. Accordingly, even in a case where the lenticular display is observed at an angle at which the lenticular display is viewed straight on or at an angle close to the angle at which the lenticular display is viewed straight on, the image A is displayed, and hence the image A is more easily visually recognized.

Figure 6:
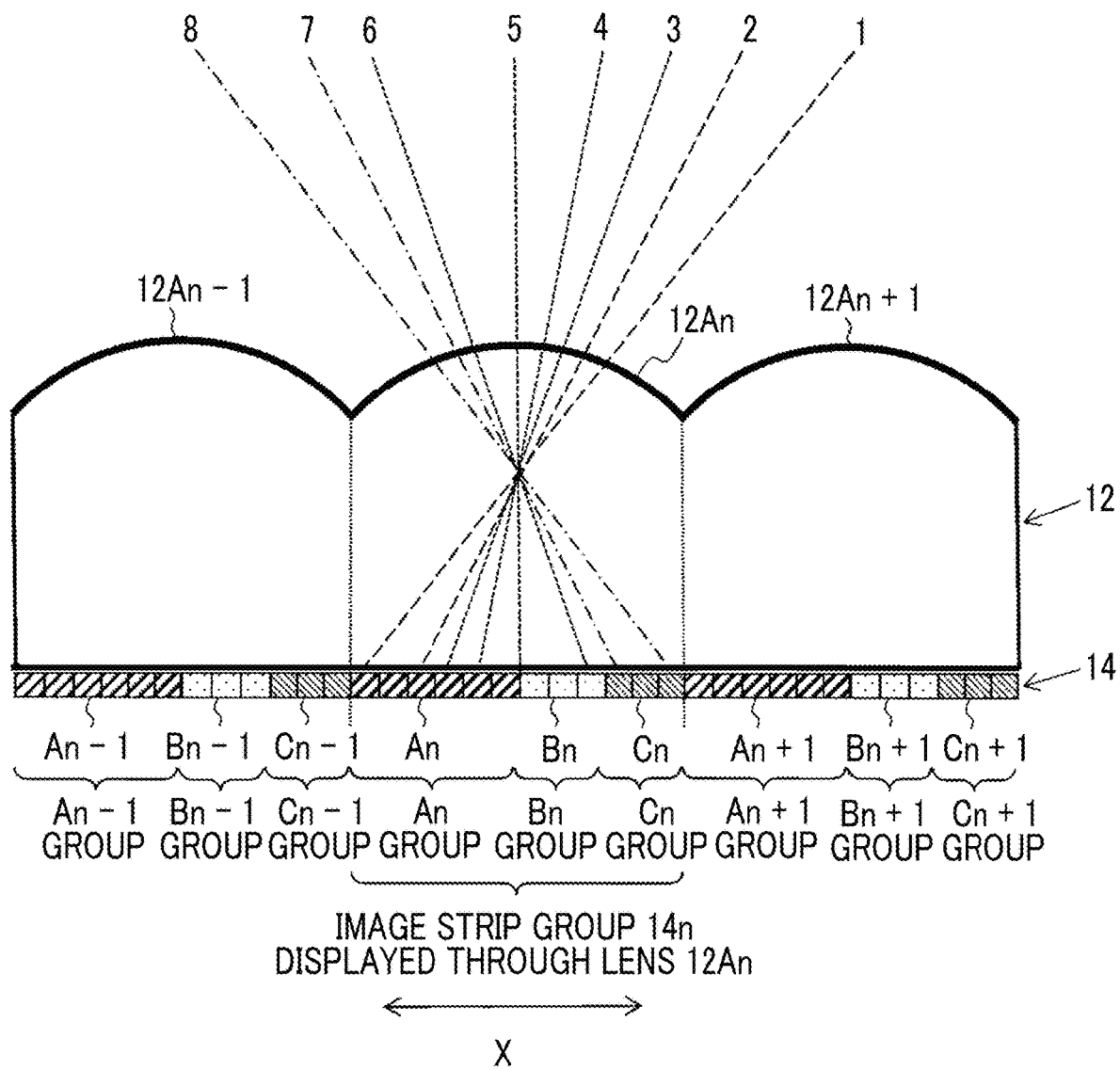
FIG. 6 is a schematic view showing another example of the image strip groups arranged under the convex lenses of the lenticular display of the present disclosure.

FIG. 6 schematically shows another example of the image strip groups of the lenticular image 14 disposed under convex lenses of the lenticular lens 12 of the lenticular display of the present disclosure. In the example shown in FIG. 6, an aspect is illustrated in which three images A, B, and C are displayed. For example, under the convex lens 12An, in the width direction X of the convex lens 12An, the An image strip group (An group) in which six image strips An are arranged in parallel, the Bn image strip group (Bn group) in which three image strips Bn are arranged in parallel, and a Cn image strip group (Cn group) in which three image strips Cn are arranged in parallel are arranged in this order, in a state where the longitudinal direction of each of the image strip groups is parallel to the longitudinal direction of the convex lens. In this way, the image strip groups constitute the image strip group 14$n$ displayed through the convex lens 12An. Likewise, under the convex lens 12An−1, in the width direction of a convex lens 12An−1, an An−1 image strip group (An−1 group) in which six image strips An−1 are arranged in parallel, the Bn−1 image strip group (Bn−1 group) in which three image strips Bn−1 are arranged in parallel, and a Cn−1 image strip group (Cn−1 group) in which three image strips Cn−1 are arranged in parallel are arranged in this order, in a state where the longitudinal direction of each of the image strip groups is parallel to the longitudinal direction of the convex lens. In this way, the image strip groups constitute an image strip group displayed through the convex lens 12An−1. Furthermore, under the convex lens 12An+1, in the width direction of the convex lens 12An+1, the An+1 image strip group (An+1 group) in which six image strips An+1 are arranged in parallel, the Bn+1 image strip group (Bn+1 group) in which three image strips Bn+1 are arranged in parallel, and a Cn+1 image strip group (Cn+1 group) in which three image strips Cn+1 are arranged in parallel are arranged in this order, in a state where the longitudinal direction of each of the image strip groups is parallel to the longitudinal direction of the convex lens. In this way, the image strip groups constitute an image strip group displayed through the convex lens 12An+1. In the lenticular display shown in FIG. 6, in each image strip group displayed through each convex lens 12A, among the image strips for displaying three images A, B, and C respectively, the image strips (for example, the image strips An, An−1, and An+1) for displaying the image A have the largest total width. Therefore, in a case where the lenticular display is observed, the image A is displayed at a relatively wide angle. In a case where the lenticular display for performing display shown in FIG. 6 is observed from the semicylindrical surface side of the lenticular lens, for example, along the visual lines 1 to 4, the image A is displayed which is formed of the image strips An for displaying the image A that are enlarged and composed through the convex lens 12An in the width direction X. Along the visual line 6, the image B is displayed which is formed of the image strips Bn that are enlarged and composed through the convex lens 12 An. Along the visual lines 7 and 8, the image C is displayed which is formed of the image strips Cn that are enlarged and composed through the convex lens 12An. In addition, along the visual line 5, an image is displayed in which the image A and the image B are mixed up.

Figure 7:
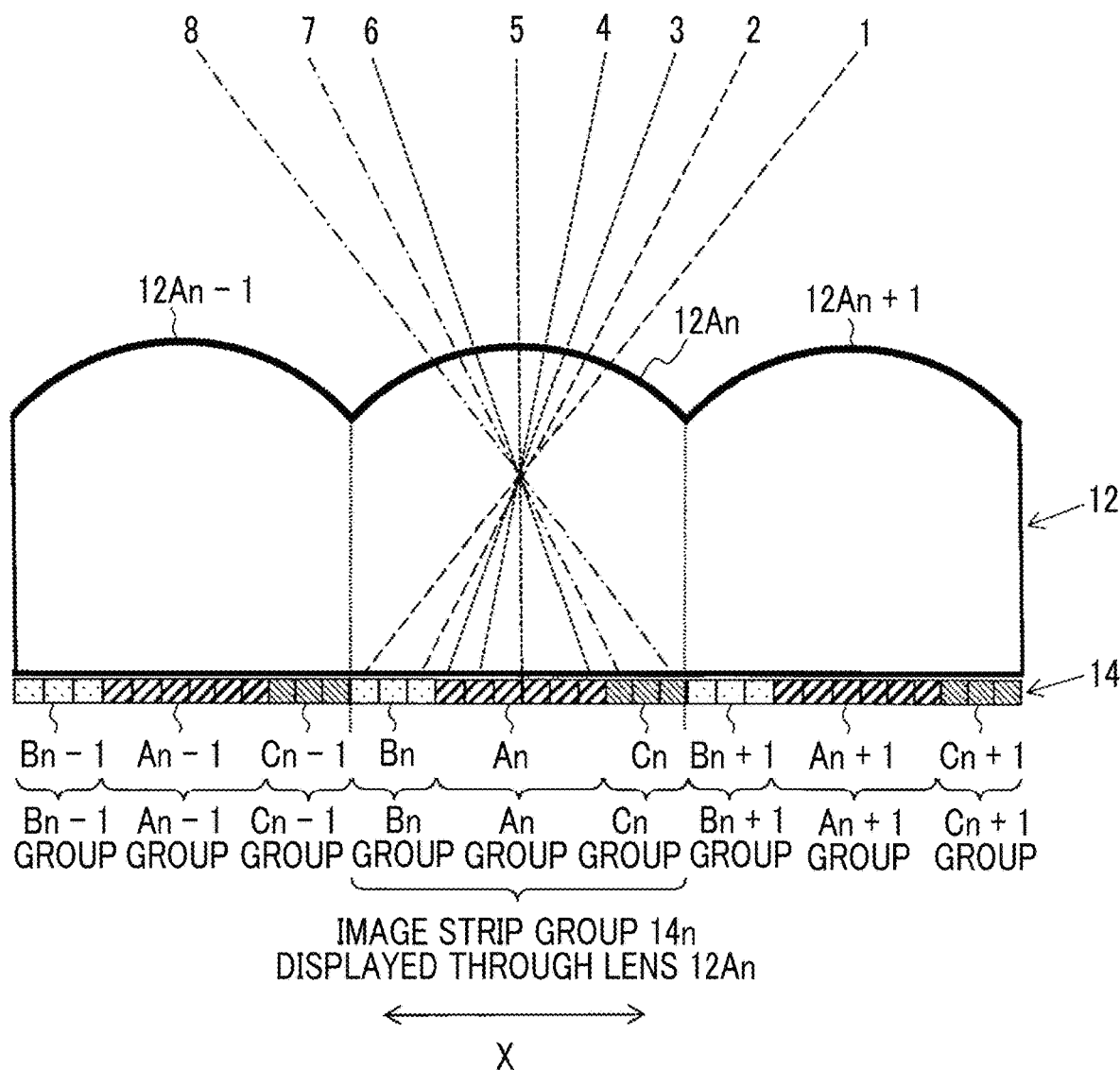
FIG. 7 is a schematic view showing another example of the image strip groups arranged under the convex lenses of the lenticular display of the present disclosure.

FIG. 7 schematically shows another example of the image strip groups of the lenticular image 14 disposed under the convex lenses of the lenticular lens 12 of the lenticular display of the present disclosure. In FIG. 7, an aspect is illustrated in which three images A, B, and C are displayed in the same manner as in the example shown in FIG. 6. In the example shown in FIG. 7, under the convex lens 12An, in the width direction X of the convex lens 12An, the Bn image strip group (Bn group) in which three image strips Bn are arranged in parallel, the An image strip group (An group) in which six image strips An are arranged in parallel, and the Cn image strip group (Cn group) in which three image strips Cn are arranged in parallel are arranged in this order in a state where the longitudinal direction of each of the image strip groups is parallel to the longitudinal direction of the convex lens. In this way, the image strip groups constitute the image strip group 14$n$ displayed through the convex lens 12An. Likewise, under the convex lens 12An−1, in the width direction of the convex lens 12An−1, the Bn−1 image strip group (Bn−1 group) in which three image strips Bn−1 are arranged in parallel, the An−1 image strip group (An−1 group) in which six image strips An−1 are arranged in parallel, and the Cn−1 image strip group (Cn−1 group) in which three image strips Cn−1 are arranged in parallel are arranged in this order, in a state where the longitudinal direction of each of the image strip groups is parallel to the longitudinal direction of the convex lens. In this way, the image strip groups constitute an image strip group displayed through the convex lens 12An−1. Furthermore, under the convex lens 12An+1, in the width direction of the convex lens 12An+1, the Bn+1 image strip group (Bn+1 group) in which three image strips Bn+1 are arranged in parallel, the An+1 image strip group (An+1 group) in which six image strips An+1 are arranged in parallel, and the Cn+1 image strip group (Cn+1 group) in which three image strips Cn+1 are arranged in parallel are arranged in this order, in a state where the longitudinal direction of each of the image strip groups is parallel to the longitudinal direction of the convex lens. In this way, the image strip groups constitute an image strip group displayed through the convex lens 12An+1. In the lenticular display shown in FIG. 7, regarding the image strip group disposed under each convex lens, among the image strips for displaying three images A, B, and C respectively, the image strips (for examples, the image strips An, An−1, and An+1) for displaying the image A have the largest total width. Therefore, in a case where the lenticular display is observed, the image A is displayed at a relatively wide angle. In a case where the lenticular display for performing display shown in FIG. 7 is observed from the semicylindrical surface side of the lenticular lens, for example, along the visual lines 1 and 2, the image B is displayed which is formed of the image strips Bn that are enlarged and composed through the convex lens 12An. Along the visual lines 3 to 6, the image A is displayed which is formed of the image strips An for displaying the image A that are enlarged and composed in the width direction X through the convex lens 12An. Along the visual lines 7 and 8, the image C is displayed which is formed of the image strips Cn that are enlarged and composed through the convex lens 12An.

In the example shown in FIG. 6, the center of the image strip group 14$n$, which is disposed under the convex lens 12An, in the width direction X is the boundary between the image strip An and the image strip Bn. Accordingly, in a case where the lenticular display is observed at an angle at which the lenticular display is viewed straight on, the image A and the image B tend to be seen in a mixed state. In contrast, in the example shown in FIG. 7, in the vicinity of the center of the image strip group 14$n$, which is disposed under the convex lens 12An, in the width direction X, the image strips An for displaying the image A are arranged. Therefore, even in a case where the lenticular display is observed at an angle at which the lenticular display is viewed straight on or at an angle close to the angle at which the lenticular display is viewed straight on, the image A is displayed. As a result, the displayed image A can be more easily visually recognized compared to the example shown in FIG. 6.

In the examples shown in FIGS. 4 to 7, the image strip group is disposed which is displayed through one convex lens and in which twelve image strips are arranged in parallel. However, in the present disclosure, the number of image strips included in the image strip group displayed through one convex lens is not limited to twelve. As the number of image strips arranged under one convex lens increases, the resolution is heightened, but the volume of data of the image strip group increases. Therefore, the number of image strips included in the image strip group for one convex lens is preferably equal to or greater than 3 and equal to or smaller than 12.

Figure 8:
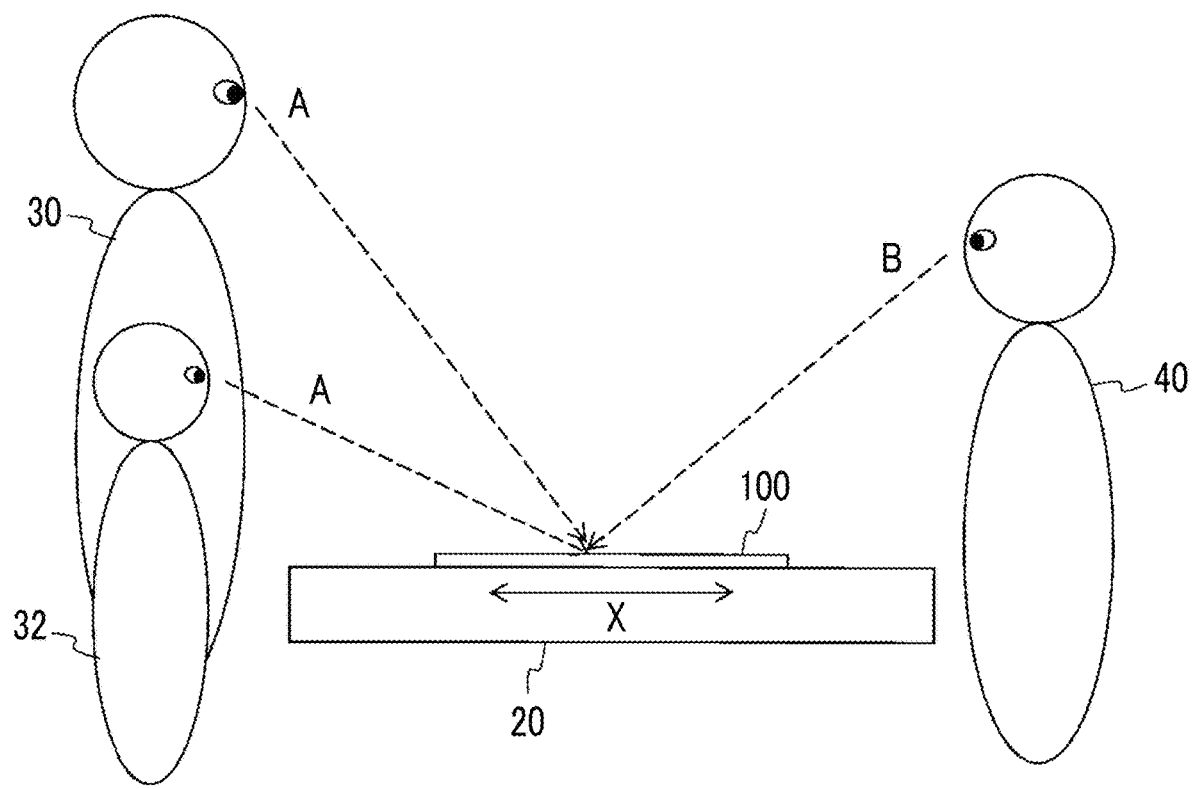
FIG. 8 is a schematic view showing an example of the way the lenticular display of the present disclosure is used.

The use of the lenticular display of the present disclosure is not particularly limited. FIG. 8 is a schematic view showing an example of the way the lenticular display of the present disclosure is used. In FIG. 8, the X-direction represents a width direction of each convex lens and a direction along which a plurality of convex lenses are arrayed. For example, in a case where a customer 30 or 32 and a clerk 40 see the lenticular display 100 of the present disclosure disposed on a table 20 in a store such as a convenience store or a restaurant, while the image B displayed at a narrow angle is shown to the clerk 40, the image A displayed at a wide angle is shown to the customer 30 or 32. Therefore, it is possible to allow the customer 30 or 32 to see the image A according to the height of a wider variety of visual lines.

Figure 9:
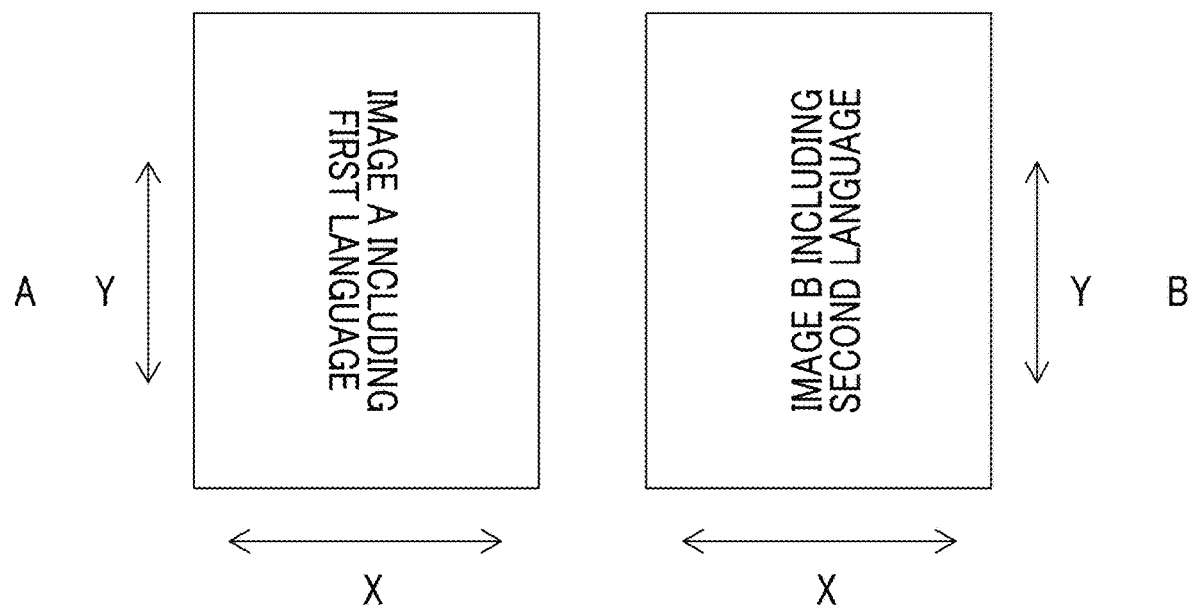
FIG. 9 is a schematic view showing an example of images displayed depending on an angle at which the lenticular display of the present disclosure is viewed.
Figure 10:
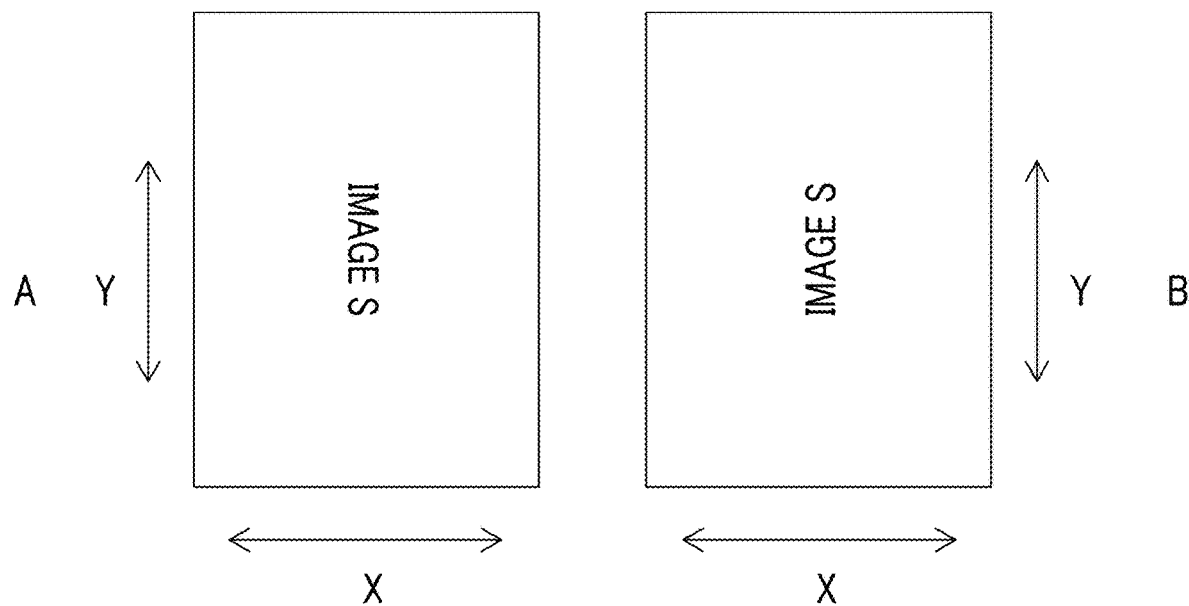
FIG. 10 is a schematic view showing another example of images displayed depending on an angle at which the lenticular display is viewed.

FIGS. 9 and 10 schematically show examples of images displayed depending on the angle at which the lenticular display of the present disclosure is viewed. In FIGS. 9 and 10, the X-direction represents a width direction of each convex lens and a direction along which a plurality of convex lenses are arrayed, and Y-direction represents a longitudinal direction of each convex lens.

For examples, in a case where a constitution shown in FIG. 9 is adopted in which the meaning of the images A and B is the same but the image A including a first language is displayed from one side A (for example, the customer side in FIG. 8) while the image B including a second language is displayed from the other side B (for example, the clerk side in FIG. 8), both the person who understands the first language (for example, English) but does not understand the second language (for example, Japanese) and the person who understands the second language but does not understand the first language can easily understand what the images mean.

Furthermore, for example, the image strip groups may be arranged such that inverted images of the same image S are seen from A side and B side respectively as shown in FIG. 10, and that the image can be visually recognized at a wider angle on A side.

Hitherto, embodiments of the present invention have been described, but the present invention is not limited to the embodiments described above.

For example, on a surface (rear surface) on an opposite side from a surface of the lenticular image on which the lenticular lens is disposed, a protective layer for protecting the lenticular image may be provided. Examples of the protective layer include paper, a resin film, a metal sheet, foamed polystyrene, and the like. Furthermore, the rear surface of the lenticular image may be coated with paint and then dried such that the protective layer is provided.

The entire disclosure of JP2015-198523 filed on Oct. 6, 2015 is incorporated into the present specification by reference.

All of the documents, the patent applications, and the technical specifications described in the present specification are incorporated into the present specification by reference, as if the present specification describes that each of the documents, the patent applications, and the technical specifications are specifically and individually incorporated into the present specification by reference.

What is claimed is:

1. A lenticular display comprising:
   a lenticular lens including a plurality of columnar convex lenses that each have a semicylindrical surface and are arrayed in parallel; and
   a lenticular image disposed on an opposite side of the plurality of columnar convex lenses from the semicylindrical surface,
   wherein the lenticular image includes an image strip group in which a plurality of image strips for displaying a plurality of display images respectively are arranged in positions for causing the image strips to be displayed through the plurality of convex lenses respectively, in a state where a longitudinal direction of the image strips is parallel to a longitudinal direction of the plurality of convex lenses, and in the image strip group, a total width of image strips for displaying at least one display image among the plurality of display images is larger than a total width of image strips for displaying another display image.

2. The lenticular display according to claim 1, wherein a relative position of the center of the image strip group, which is displayed through each of the convex lenses, in a width direction deviates from the center of each of the convex lenses in the width direction along the width direction of the plurality of convex lenses.

3. The lenticular display according to claim 2, wherein a ratio of deviation of the relative position of the center of the image strip group in the width direction from the center of each of the convex lenses in the width direction is 10% to 40% of a width of each of the convex lenses.

4. The lenticular display according to claim 2, wherein a ratio of deviation of the relative position of the center of the image strip group in the width direction from the center of each of the convex lenses in the width direction is 16% to 25% of a width of each of the convex lenses.

5. The lenticular display according to claim 1, wherein the number of the plurality of image strips included in the image strip group for one convex lens is equal to or greater than 3 and equal to or smaller than 12.

6. The lenticular display according to claim 1, wherein the image strips having a large total width are arranged in positions including the center of the image strip group in the width direction.

* * * * *